US012741519B2

(12) United States Patent
Zheng et al.

(10) Patent No.: US 12,741,519 B2
(45) Date of Patent: Sep. 22, 2026

(54) TRI-FOLD SEMI-EMBEDDED COVER FOR FRONT BAR WITH FRONT EXTENSION PANEL

(71) Applicant: Yunyan He, Hangzhou (CN)

(72) Inventors: Shaoyong Zheng, Hangzhou (CN); Yunyan He, Hangzhou (CN)

(73) Assignee: Yunyan He, Hangzhou (CN)

( * ) Notice: Subject to any disclaimer, the term of this patent is extended or adjusted under 35 U.S.C. 154(b) by 276 days.

(21) Appl. No.: 18/641,704

(22) Filed: Apr. 22, 2024

(65) Prior Publication Data

US 2025/0269707 A1 Aug. 28, 2025

(30) Foreign Application Priority Data

Feb. 24, 2024 (CN) ......................... 202410204671.3

(51) Int. Cl.
*B60J 7/19* (2006.01)
*B60J 7/14* (2006.01)

(52) U.S. Cl.
CPC ............... *B60J 7/198* (2013.01); *B60J 7/141* (2013.01)

(58) Field of Classification Search
CPC .................................. B60J 7/141; B60J 7/198
See application file for complete search history.

(56) References Cited

U.S. PATENT DOCUMENTS 8,960,765 B2 * 2/2015 Facchinello ............. B60J 7/141 296/100.09
9,815,357 B2 * 11/2017 Hall ......................... B60J 7/198
10,399,420 B2 * 9/2019 Rossi ....................... B60J 7/198
10,730,375 B2 * 8/2020 Ma ........................... B60P 7/02
10,960,745 B2 * 3/2021 Dylewski, II ............ B60J 7/198
11,007,856 B1 * 5/2021 Fu ........................... B60J 7/198
11,059,359 B2 * 7/2021 Dylewski, II ............ B60J 7/141
11,235,650 B2 * 2/2022 Gu ........................... B60P 7/02
11,299,021 B2 * 4/2022 Dylewski, II ............ B60J 7/198
11,345,223 B2 * 5/2022 Zheng .................... B60J 7/1607
11,376,935 B2 * 7/2022 Fu ........................... B60J 7/141
11,890,921 B2 * 2/2024 Qiu .......................... B60J 7/198
2008/0100088 A1 * 5/2008 Calder ..................... B60J 7/141 296/100.09
2017/0291478 A1 * 10/2017 Hall ......................... B60J 7/141
2023/0322059 A1 * 10/2023 Dylewski, II ............ B60J 7/141 296/100.09
2023/0382208 A1 * 11/2023 Wu .......................... B60J 7/141
(Continued)

FOREIGN PATENT DOCUMENTS

CA 3075556 C * 3/2022 .............. B60J 7/141
CN 217477059 U * 9/2022 .............. B60J 7/141
(Continued)

*Primary Examiner* — Jason S Morrow

(57) ABSTRACT

The present invention discloses a triple-fold semi-embedded cover for a front bar with front extension panel, including a front bar, a panel body, a first rotating shaft system, a second rotating shaft system, a locking system, a support rod system, a back bar, a guide rail and a front bar fixing system, the front bar fixing system is connected to the front bar, the locking system is connected to the back bar, the first rotating shaft system is provided with a first rotating shaft, the second rotating shaft system is provided with a second rotating shaft, the first rotating shaft is of a width greater than or equal to the width of the second rotating shaft.

12 Claims, 12 Drawing Sheets

(56) References Cited

U.S. PATENT DOCUMENTS

| | | | | |
|---|---|---|---|---|
| 2024/0198772 | A1* | 6/2024 | Cai | B60J 7/1607 |
| 2024/0217322 | A1* | 7/2024 | Wu | B60J 7/141 |
| 2024/0278629 | A1* | 8/2024 | Liu | B60J 7/141 |
| 2024/0286470 | A1* | 8/2024 | Wang | B60J 7/141 |
| 2024/0300308 | A1* | 9/2024 | Chen | B60J 7/141 |
| 2024/0308310 | A1* | 9/2024 | He | B62D 33/02 |
| 2024/0384736 | A1* | 11/2024 | Zheng | B60P 7/02 |
| 2024/0408946 | A1* | 12/2024 | Zheng | B60J 7/141 |
| 2025/0256787 | A1* | 8/2025 | Zheng | B62D 33/044 |
| 2025/0269705 | A1* | 8/2025 | Zheng | B60J 7/198 |

FOREIGN PATENT DOCUMENTS

| | | | | | |
|---|---|---|---|---|---|
| CN | 219339163 | U | * | 7/2023 | |
| CN | 117545646 | A | * | 2/2024 | B60J 7/14 |

* cited by examiner

TRI-FOLD SEMI-EMBEDDED COVER FOR FRONT BAR WITH FRONT EXTENSION PANEL

TECHNICAL FIELD

This invention is relevant to automotive spare parts, especially a tri-fold semi-embedded cover for front bar with front extension panel.

BACKGROUND TECHNOLOGY

Pickup trucks have both car-like comfort and strong power, due to the pickup truck's strong ability to carry cargo and adapt to poor road surface, its comprehensive performance also makes it become one of the common off-road models nowadays.

In order to make the pickup truck to adapt to more diverse environments, most of the existing pickup trucks will be installed cover, most of the current cover is hard cover, which is divided into upright type and flat type, the cover of the flat type can not be completely open, that is, the last plate can not be turned, only two-thirds of the cover can be opened, resulting in the inconvenience of fetching and putting things, the upright car cover can be opened almost all the way, however, the upright car cover is the state of standing up after opening, and it needs to stand on the front bar, so it is necessary to ensure the stability of the connection of the front bar.

The front bar of the existing car cover is tightened with the car cover rail by a screw, which leads to poor stability of the front bar connection end due to a single structure.

About the Invention

To overcome the deficiencies of the prior art, the present invention provides a tri-fold semi-embedded cover of a front bar with front extension panel, by changing the connecting structure of the front bar, to solve the above problem.

In order to solve the above problems of the existing technology, the technical solution adopted in the invention is as follows:

A tri-fold semi-embedded cover for a front bar with front extension panel, it includes a front bar, a panel body, a first rotating plate system, a second rotating plate system, a locking system, a support rod system, a rear bar, a guide rail and a front bar fixing system;

The front bar fixing system is connected to the front bar, the locking system is connected to the back bar, the first rotating plate system is provided with a first rotating plate, the second rotating plate system is provided with a second rotating plate, the first rotating plate is of a width greater than or equal to the width of the second rotating plate;

The support rod system includes a cylindrical head base, a support rod and a ball head support, the cylindrical head base is connected to the first rotating plate, the cylindrical head base is connected with the ball head support, the ball head support is used to connect the ball head on the support rod, the support rod system is connected with a clamp support system, the clamp support system is connected with a support block, the support block is used to fix the support rod;

The front bar fixing system includes a sliding clamp and a fixing piece, the sliding clamp is provided with a clamp head, the fixing piece is provided with a clamp head positioning side wing, the clamp head positioning side wing is adapted to fit with the clamp head.

A tri-fold semi-embedded cover for a front bar with front extension panel, it includes a front bar, a panel body, a first rotating plate system, a second rotating plate system, a locking system, a support rod system, a rear bar, a guide rail and a front bar fixing system;

The front bar fixing system is connected to the front bar, the locking system is connected to the rear bar, the first rotating plate system is provided with a first rotating plate, the second rotating plate system is provided with a second rotating plate, the first rotating plate is of a width greater than or equal to the width of the second rotating plate;

The support rod system includes a cylindrical head base, a support block, a ball head support and a support rod, the cylindrical head base is connected to the first rotating plate, the cylindrical head base is connected with a ball head support, the ball head support is used to connect a ball head on the support rod, the support block is connected with the guide rail, the support block is used to fix the support rod;

The front bar fixing system includes a sliding clamp and a fixing piece, the sliding clamp is provided with a clamp head, the fixing piece is provided with a clamp head positioning side wing, the clamp head positioning side wing is fitted to the clamp head.

A tri-fold semi-embedded cover for a front bar with front extension panel, it includes a front bar, a panel body, a first rotating plate system, a second rotating plate system, a locking system, a support rod system, a rear bar, a guide rail and a front bar fixing system;

The front bar fixing system is connected to the front bar, the locking system is connected to the rear bar, the locking system includes a lock bolt, the first rotating plate system is provided with a first rotating plate and a large rotating plate, the second rotating plate system is provided with a second rotating plate, the first rotating plate is of a width greater than or equal to the width of the second rotating plate;

The support rod system includes a cylindrical head base, a ball head support and a support rod, the cylindrical head base is connected to the large rotating plate, the cylindrical head base is connected with the ball head support, the ball head support is used to connect the ball head on the support rod, the support rod system is connected to a clamp support system, the clamp support system is connected to a support block, the support block is used to fix the support rod, the cylindrical head base is provided with a horizontal surface;

The front bar fixing system includes a sliding clamp and a fixing piece, the sliding clamp is provided with a clamp head, the fixing piece is provided with a clamp head positioning side wing, the clamp head positioning side wing is fitted to the clamp head.

The clamp system is connected to the car body, the guide rail is provided with a guide rail notch.

The clamp system can be connected to the car body only without connecting to the guide rails. In order to avoid the guide rail, the guide rail needs to be provided with a guide rail notch.

Further, the support rod system includes a cylindrical head base, a support rod, a ball head, a ball head support, a first cylinder, a second cylinder and a bottom cap;

The cylindrical head base is provided with a protrusion, a fixing threaded hole and a cylindrical head base fixing hole, the fixing threaded hole and the cylindrical head base fixing hole are provided vertically to each other, the screws connect the cylindrical head base to the first rotating plate through the cylindrical head base fixing hole, the fixing threaded hole are connected with a ball head support, the ball head support is connected with a ball head;

One end of the support rod is connected to the ball head, the other end of the support rod is connected to the half-waist hole of the support block, the support rod is provided with a support rod thread, the support rod thread is connected to a first cylinder and a second cylinder, the end of the support rod is connected to a bottom cap. The bottom cap is used to prevent the end of the support rod from scratching the fingers, the support rod is held in place by adjusting the distance between the first and second cylinders to clamp the half-waist holes on the support block, the support rod is provided with a support step for blocking the first cylinder.

Further, the cylindrical head base is provided with a horizontal surface and a fixing threaded opening, the horizontal surface is provided in parallel with the bottom surface of the joint, the fixing threaded opening is used to fix a ball head support, the ball head support is used to fix the support rod.

Further, the second rotating plate system includes a first rotating plate small joint, a rotating plate joint, a second rotating plate small joint, a first small rotating plate, a second rotating plate, a third rotating plate rubber strip, a fourth rotating plate rubber strip and a second small rotating plate;

The first small rotating plate is connected to the second rotating plate, a third rotating plate rubber strip is provided between the first small rotating plate and the second rotating plate, the second rotating plate is connected to the second small rotating plate, a fourth rotating plate rubber strip is provided between the second rotating plate and the second small rotating plate, the first small rotating plate, the second rotating plate, the second small rotating plate, the third rotating plate rubber strip and the fourth rotating plate rubber strip constitute a rotating plate system, both ends of the rotating plate system is connected with a first rotating plate small joint, a rotating plate joint and a second rotating plate small joint.

Further, the second rotating plate system includes a large joint, a joint, a small joint, a large rotating plate, a second rotating plate, a first rotating plate rubber strip, a second rotating plate rubber strip, and a small rotating plate;

The large rotating plate is connected with the first rotating plate, a first rotating plate rubber strip is provided between the large rotating plate and the first rotating plate, the second rotating plate is connected with the small rotating plate, a second rotating plate rubber strip is provided between the small rotating plate and the second rotating plate; the large rotating plate, the second rotating plate, the small rotating plate, the first rotating plate rubber strip, and the second rotating plate rubber strip constitute a rotating plate system, both ends of that rotating plate system are connected with a large joint, a joint, and a small joint.

Further, the front bar fixing system includes a sliding clamp, a fixing piece, an extension panel, a front bar plum nut, a right securing clamp, a left securing clamp, a screw, a plum nut, and a T-screw;

The sliding clam is provided with a clamp thread and a clamp head;

The fixing piece includes a clamp head positioning side wing, a fixing resisting step and a fixing nut hole;

The extension panel includes a fine adjustment hole, a first screw hole, a second screw hole and an extension panel protrusion;

The front bar plum nut is provided with a thread head, a first step, a second step and a third step;

The left securing clamp is provided with a support plane, a left clamp groove, and a left clamp step;

The sliding clamp in cooperation with the fixing piece to connect the processing groove of the first profile, the clamp profile are provided in the processing groove against the step and the fixing resisting step, the head positioning side wings are provided on both sides of the clamp head, the fixing nut holes and the clamp head are overlapping provided and cooperated with the fixing nut hole through the thread head, the second step is seated on the clamp head, so that the front bar plum nut makes the sliding clamp and the fixing piece fit, the clamp thread secures the sliding clamp and the fixing piece in the processing groove by means of a screw, the fine adjust hole is assembled in cooperation with the front bar plum nut, the front bar plum nut passes through the fine adjustment hole, rotates and then snaps into place with the extension panel through the third step, the centre of the first step and the second step are fitted with the half U-shaped hole of the clamp head.

Further, the clamp support system is connected to the car body, the guide rail is provided with a guide rail notch, the clamp system is provided in the guide rail notch.

Further, the front bar is a split structure, the front bar includes a first profile and a second profile, the first profile is provided with a gluing groove, the second profile is provided with a profile first gluing surface and a profile second gluing surface, the second profile is bonded to the first profile by means of the profile first gluing surface and the profile second gluing surface, the gluing groove is used to store excess glue.

The cylindrical head base and the ball head support can be a one-piece structure or a split structure, the cylindrical head base and the ball head support can be a one-piece structure or a split structure.

The beneficial effects of the present invention are:

1. By improving the connection structure of the front bar of the cover, the present invention makes the connection of the front bar more stable.
2. By adopting the structure of an extension panel, the present invention has a screw passing through the extension panel and connecting with a fixing clamp and a sliding clamp, so that it can be slightly adjusted.

DESCRIPTION OF FIG

Figure 1:
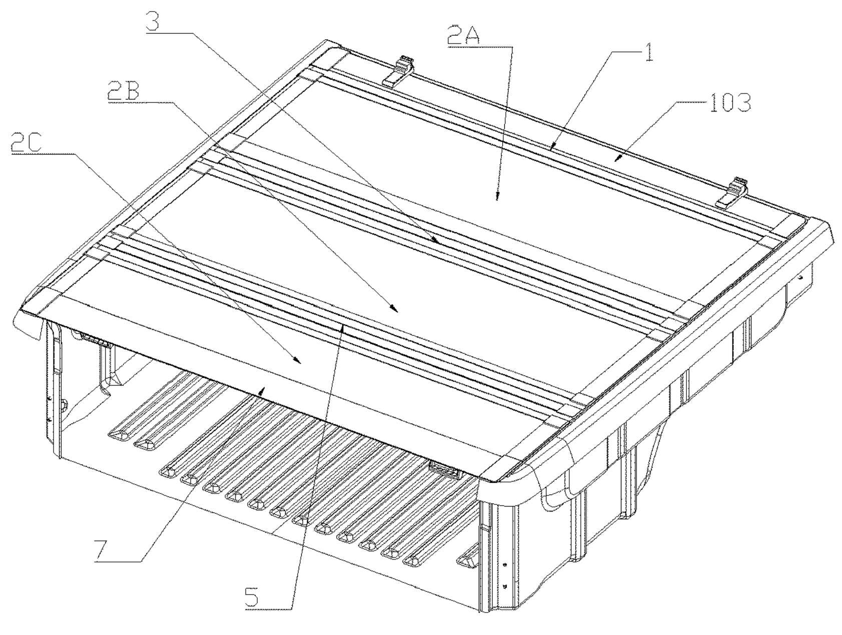
FIG. 1 is a use schematic diagram I of the present invention.
Figure 2:
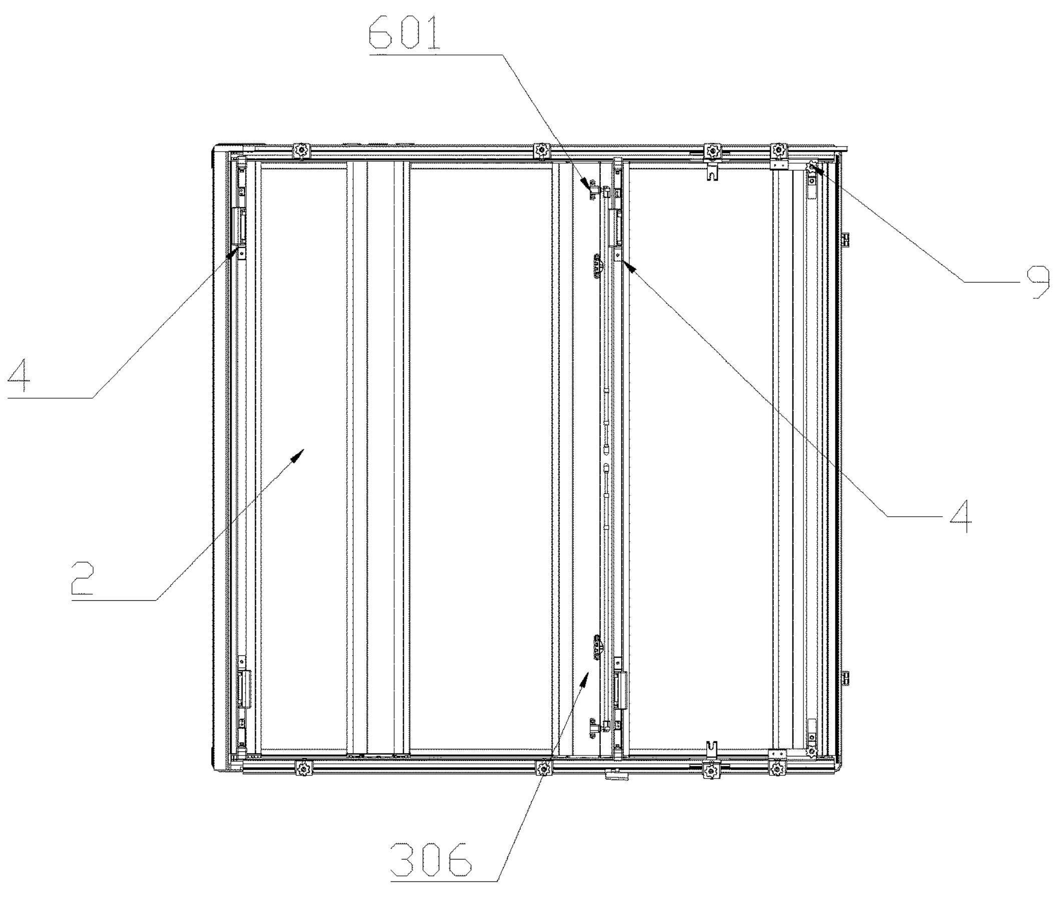
FIG. 2 is a structural schematic diagram I of the present invention.
Figure 3:
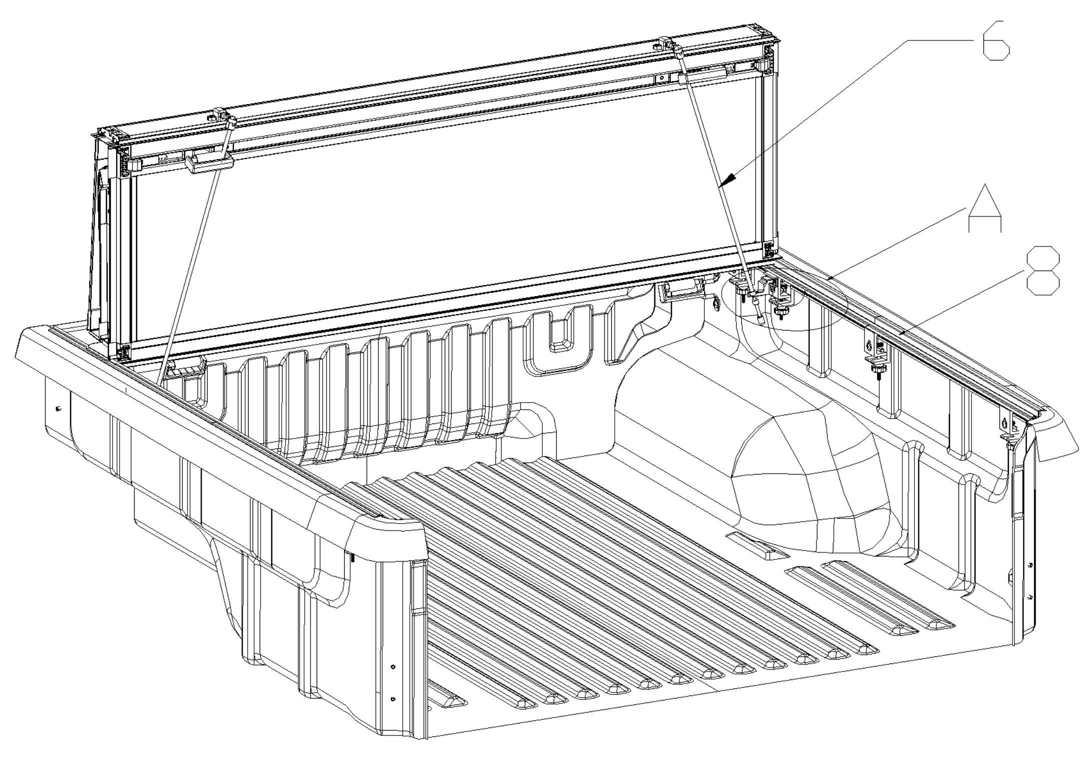
FIG. 3 is a use schematic diagram II of the present invention.
Figure 4:
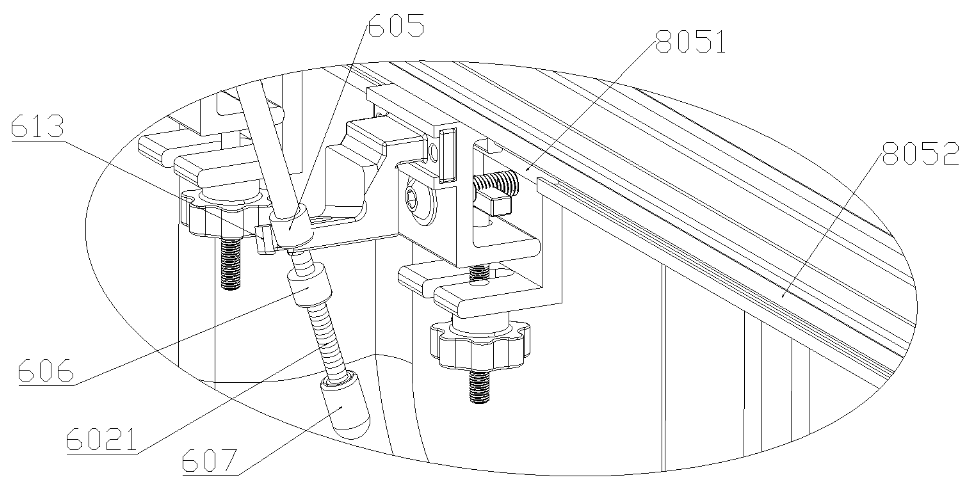
FIG. 4 is a structural schematic diagram of part A in FIG. 3.
Figure 5:
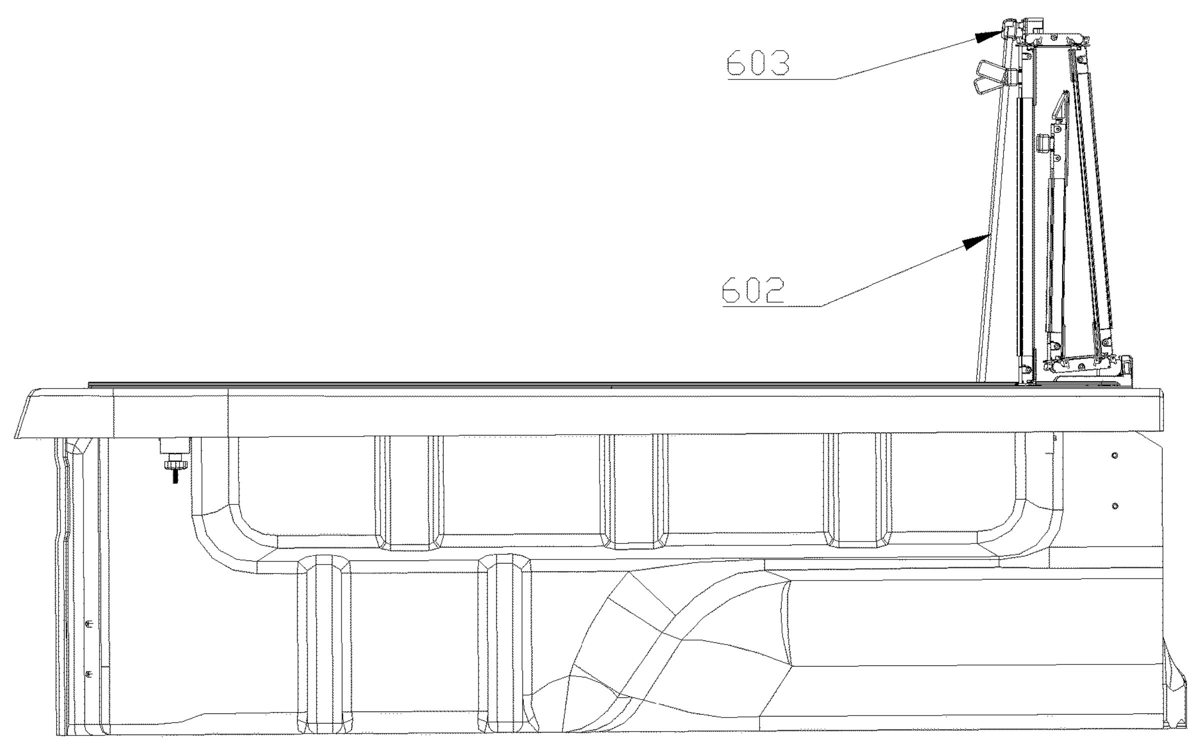
FIG. 5 is a use schematic diagram III of the use of the present invention.
Figure 6:
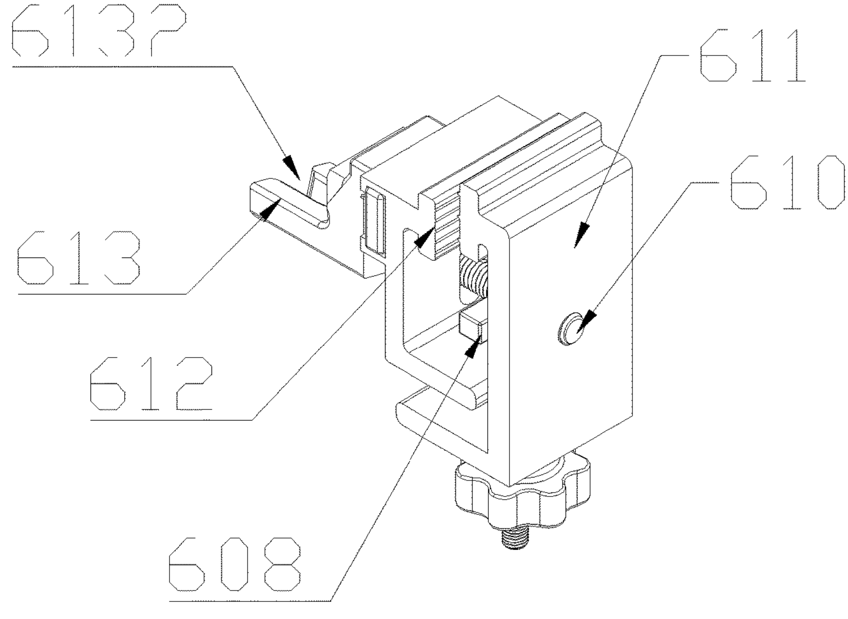
FIG. 6 is a structural schematic diagram of the clamp assembly.
Figure 7:
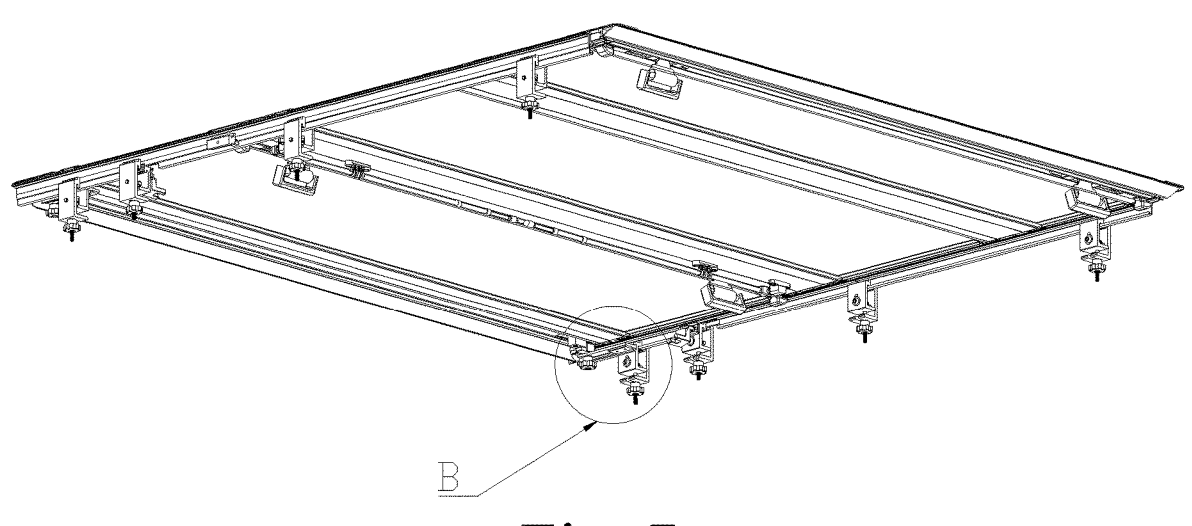
FIG. 7 is a use schematic diagram III of the use of the present invention.
Figure 8:
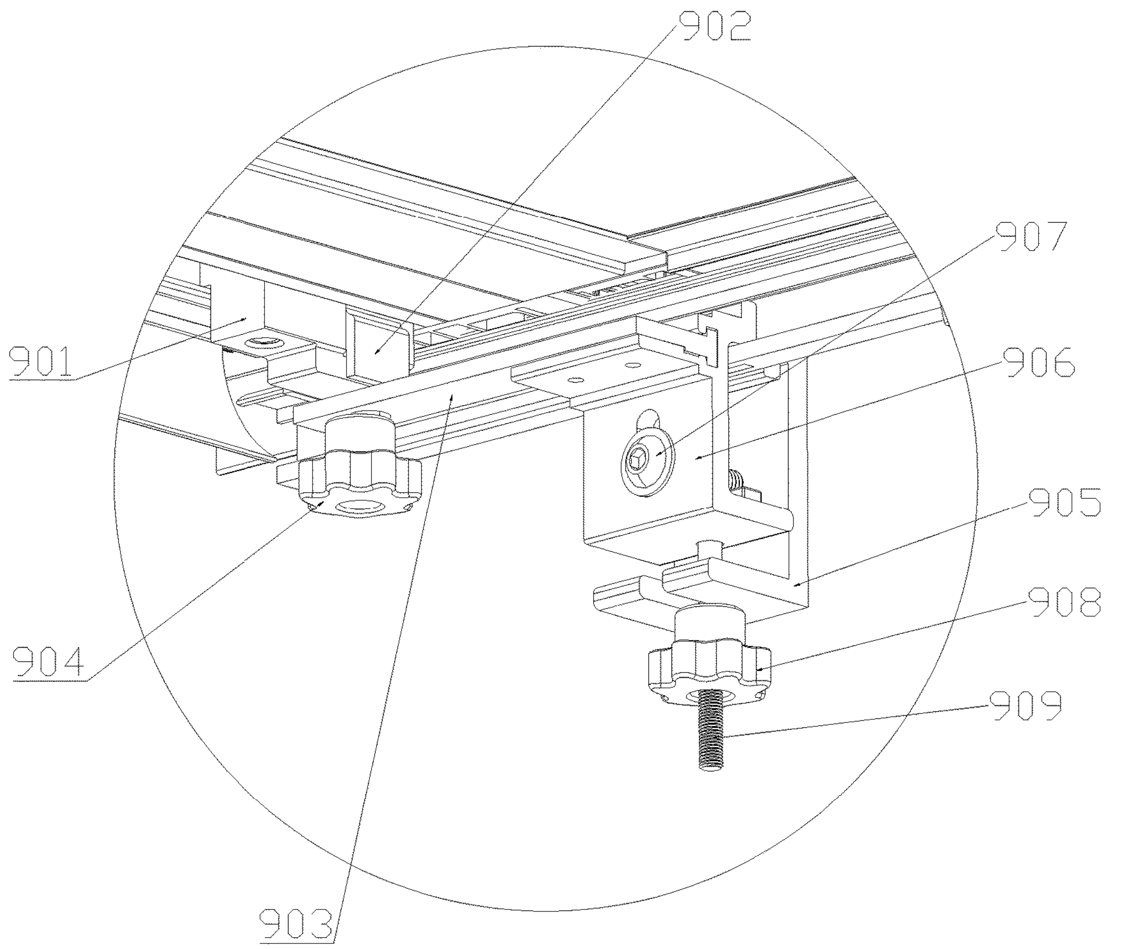
FIG. 8 is a partially enlarged view of part B in FIG. 7.
Figure 9:
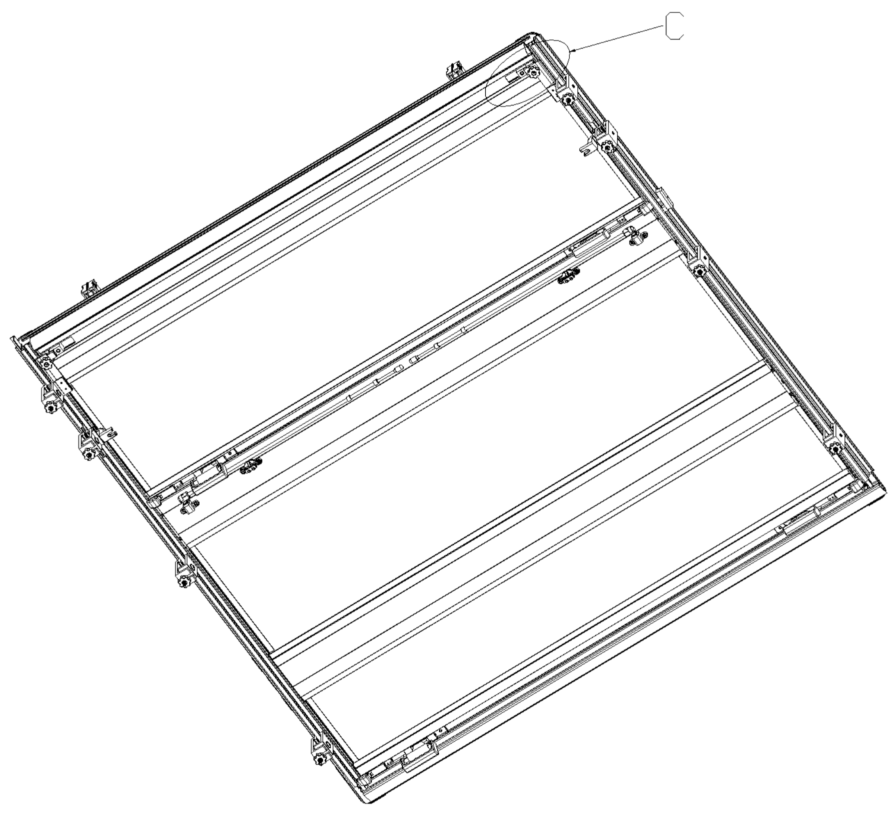
FIG. 9 is a structural schematic diagram IV of the present invention.
Figure 10:
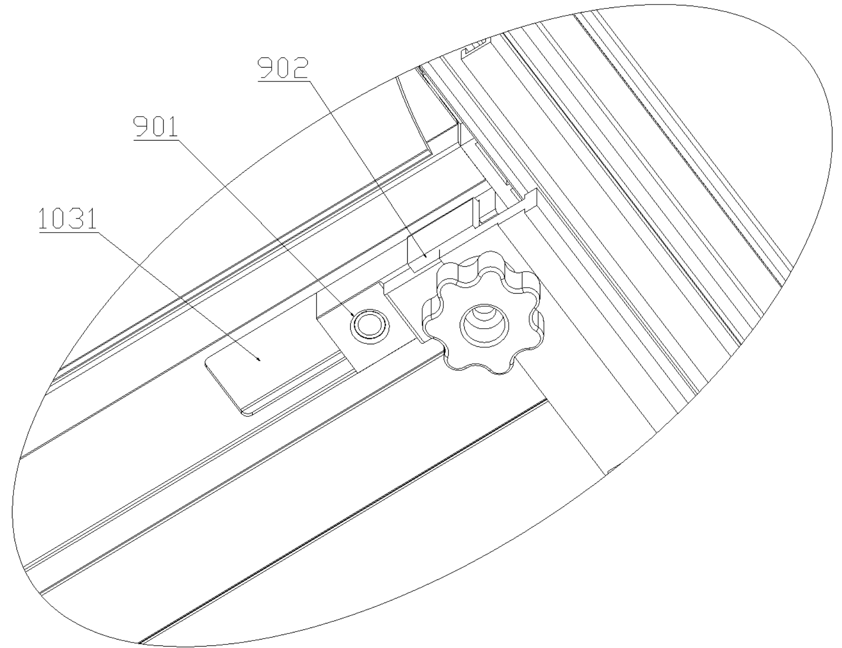
FIG. 10 is a partially enlarged view of part C in FIG. 9.
Figure 11:
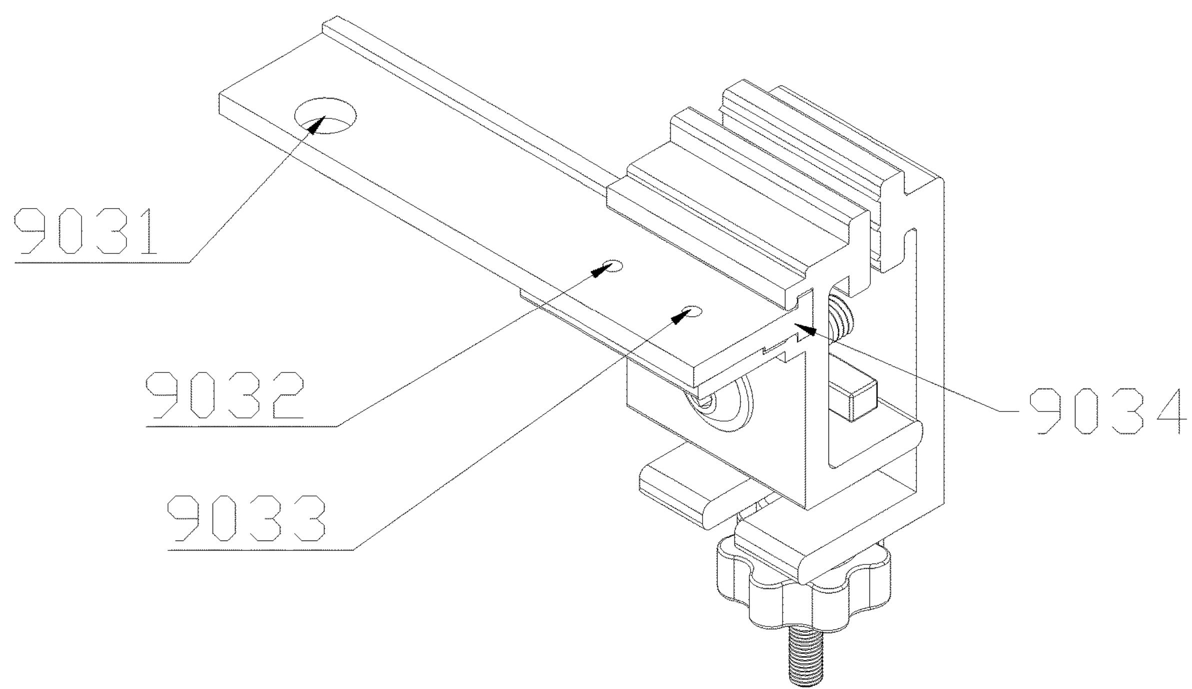
FIG. 11 is a structural schematic diagram I of the front bar fixed extension plate.
Figure 12:
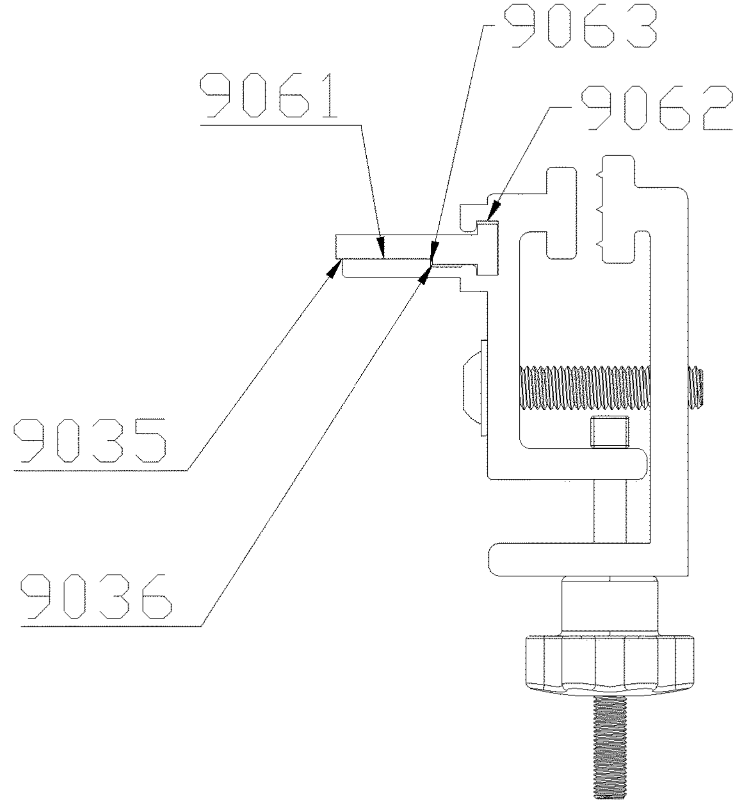
FIG. 12 is a structural schematic diagram II of the front bar fixed extension plate.
Figure 13:
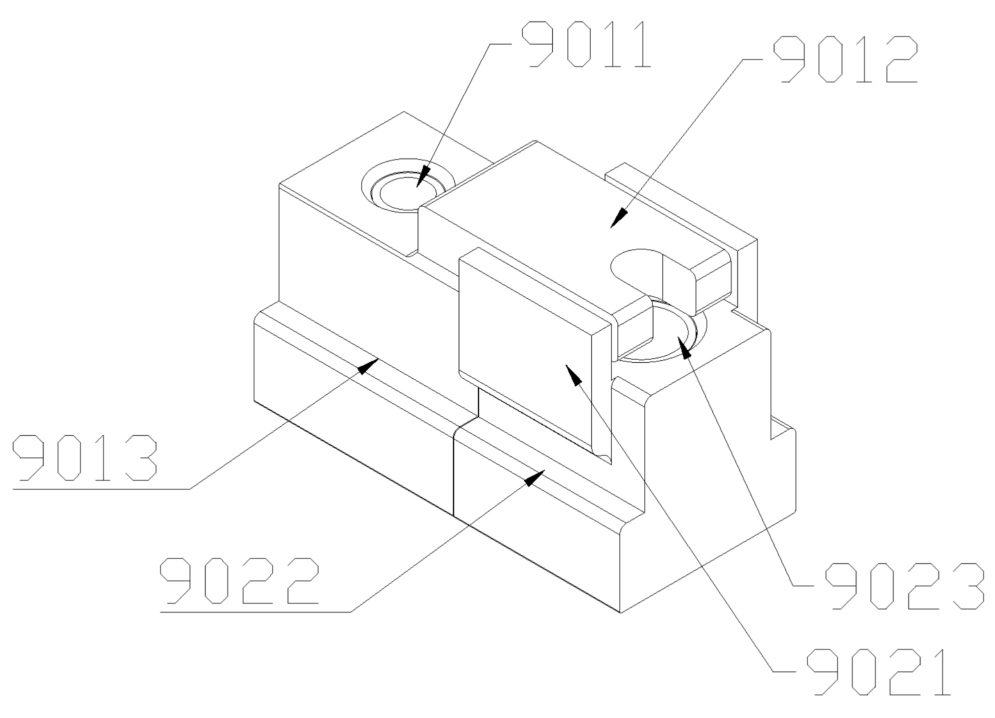
FIG. 13 is a structural schematic diagram of the front bar fixing block.
Figure 14:
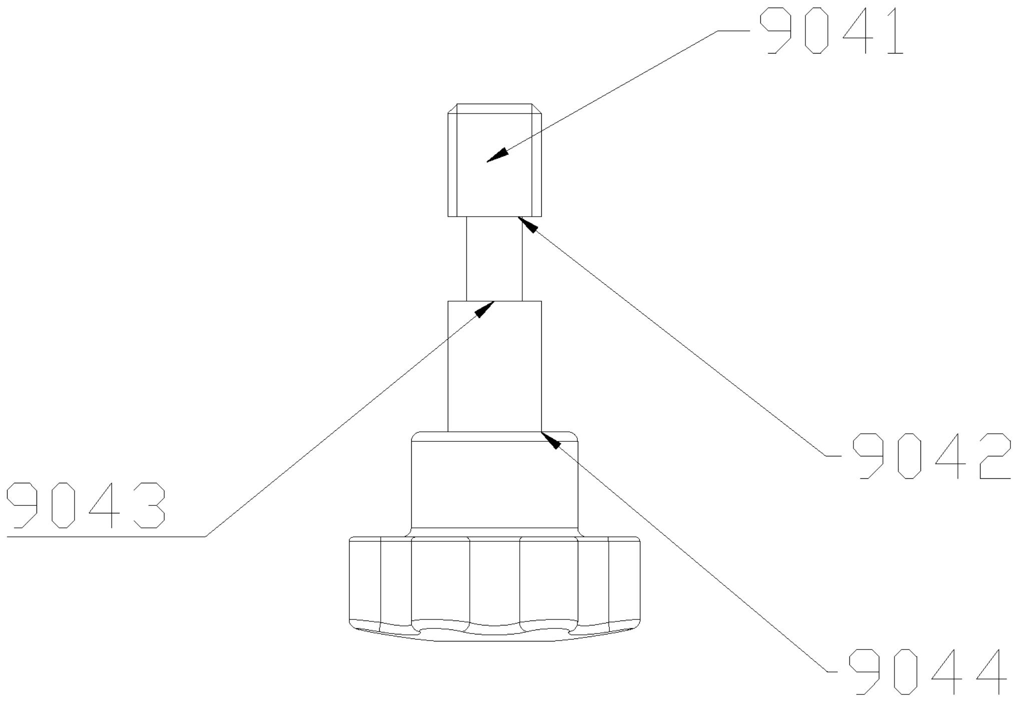
FIG. 14 is a structural schematic diagram of the screw.
Figure 15:
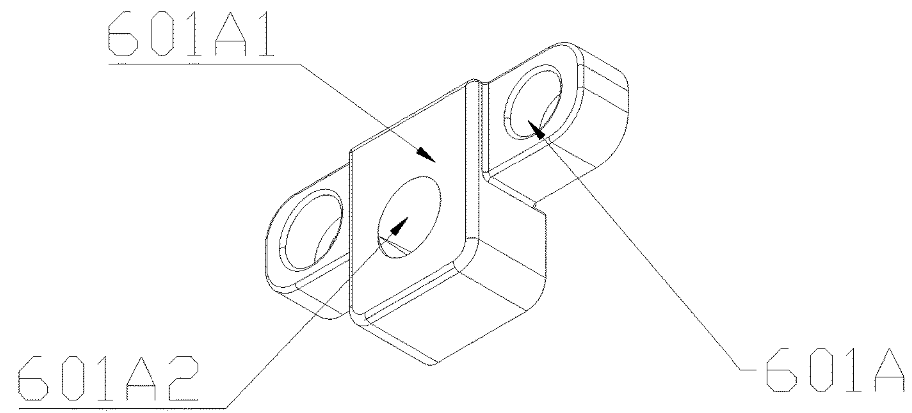
FIG. 15 is a structural schematic diagram of the support head base.
Figure 16:
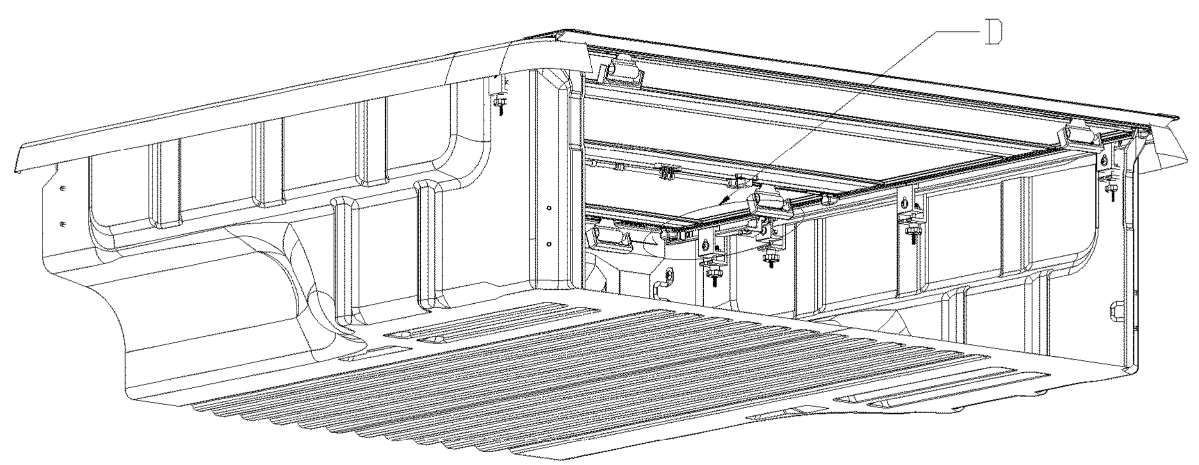
FIG. 16 is a use schematic diagram IV of the present invention.
Figure 17:
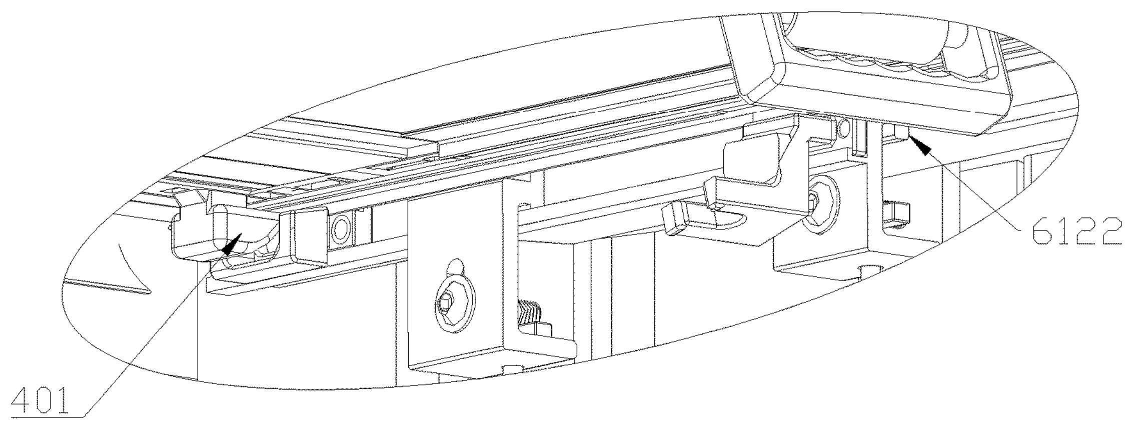
FIG. 17 is a partially enlarged view of part D in FIG. 16.

Figures: 1—Front bar; 102—Second profile; 1021—Profile first gluing surface; 1022—Profile second gluing surface; 103—First profile; 1031—Processing groove; 1032—Gluing groove; 2—Panel; 2A—Large panel; 2B—Medium panel; 2C—Small panel; 3—First rotating plate system; 301—Large joint; 302—Joint; 303—Small joint; 304—Large rotating plate; 3041—Large rotating plate bottom; 305—First rotating plate rubber strip; 306—First rotating plate; 3061—First rotating plate bottom; 307—Second rotating plate rubber strip; 308—Small rotating plate; 4—Locking system; 5—Second rotating plate system; 501—First rotating plate small joint; 502—Rotating plate joint; 503—Second small joint; 504—First small rotating shaft; 505—Third rubber strip; 506—Second rotating plate; 507—Fourth rotating plate rubber strip; 508—Second small rotating plate; 6—Support rod system; 601—Cylindrical head base; 601A—Cylindrical head base; 601A1—horizontal surface; 601A2—Fixing threaded port; 6011—Fixing threaded hole; 6012—Cylindrical head base fixing hole; 6013—Protrusion; 602—Support rod; 6021—Support rod thread; 6022—Support step; 603—Ball head; 604—Ball head support; 605—First cylinder; 606—Second cylinder; 607—Bottom cap; 613—Support block; 6132—Half-waist hole; 7—Rear bar; 8—Guide rail; 8051—Guide rail notch; 8052—Guide rail groove; 9—Front bar fixing system; 901—Sliding clamp; 9011—Clamp threads; 9012—Clamp head; 9013—Clamp profile resisting step; 902—Fixing piece; 9021—Clamp head locating side wing; 9022—Fixing resisting step; 9023—Fixing nut rod hole; 903—Extension plate; 9031—Fine adjustment holes; 9032—First screw holes; 9033—Second screw holes; 9034—Extension plate protrusion; 9035—Extension plate face; 9036—Extension step; 904—Front bar plum nut; 9041—Threaded head; 9042—First step; 9043—Second step; 9044—Third step; 905—Right securing clamp; 906—Left securing clamp; 9061—Supporting plane; 9062—Left clamp groove; 9063—Left clamp step; 907—Screws; 908—Plum nut; 909—T Screws.

The Concrete Method to Carry Out

The following instruction further explains the invention's concrete implementation method.

In order to enable a clearer understanding of the objects mentioned above, features and advantages of the present invention, the invention is described in detail below in connecting with the accompanying Fig. and specific embodiments. It should be noted that the embodiments of the present invention and the features in the embodiments can be combined without conflict.

The terms "first", "second", "third", etc. are only used to differentiate the description and should not be construed as indicating or implying relative importance.

In the description of the invention, it should also be noted that, unless otherwise expressly specified and limited, the terms "arranged," "installed," "connected," and "combined" should be understood in a broad sense, for example, it may be a fixing connecting, it can also be a detachable connecting or an integral connecting. it can be a mechanical connecting or an electrical connecting. it can be a direct connecting or an indirect connecting through an intermediate media. And it can be internal connecting within two assemblies. For those of ordinary skill in this field, specific meanings of the above terms in the present invention can be understood in specific situations.

The specific embodiments of the present invention will be described in detail below in connecting with the accompanying figure. It should be understood that the specific embodiments described herein are intended only to illustrate and explain the present invention and not to limit it.

EMBODIMENT 1

As shown in FIGS. 1-8, 13 and 19-21, a tri-fold semi-embedded cover for a front bar with front extension panel includes a front bar 1 (including first profile 103), a panel body 2 (including a large panel 2A, a medium panel 2B and a small panel 2C), a first rotating plate system 3, a second rotating plate system 5, a locking system 4, a support rod system 6, a rear bar 7, a guide rail 8 and a front bar fixing system 9;

The front bar fixing system 9 is connected to the front bar 1, the locking system 4 is connected to the rear bar 7, the first rotating plate system 3 is provided with a first rotating plate 306, the second rotating plate system 5 is provided with a second rotating plate, the first rotating plate 306 is of a width greater than or equal to the width of the second rotating plate;

The support rod system 6 includes a cylindrical head base 601, a support rod 602 and a ball head support 604, the cylindrical head base 601 is connected to the first rotating plate 306, the cylindrical head base 601 is connected with the ball head support 604, the ball head support 604 is used to connect the ball head 603 on the support rod 602, the support rod system 6 is connected with a clamp support system, the clamp support system is connected with a support block 613, the support block 613 is used to fix the support rod 602;

The front bar fixing system 9 includes a sliding clamp 901 and a fixing piece 902, the sliding clamp 901 is provided with a clamp head 9012, the fixing piece 902 is provided with a clamp head positioning side wing 9021, the clamp head positioning side wing 9021 is fitted to the clamp head 9012.

EMBODIMENT 2

As shown in FIGS. 1-8, 13 and 19-21, a tri-fold semi-embedded cover for a front bar with front extension panel includes a front bar 1, a panel body 2, a first rotating plate system 3, a second rotating plate system 5, a locking system 4, a support rod system 6, a rear bar 7, a guide rail 8 and a front bar fixing system 9;

The front bar fixing system 9 is connected to the front bar 1, the locking system 4 is connected to the rear bar 7, the first rotating plate system 3 is provided with a first rotating plate 306, the second rotating plate system 5 is provided with a second rotating plate, the first rotating plate 306 is of a width greater than or equal to the width of the second rotating plate;

The support rod system 6 includes a cylindrical head base 601, a support block 613, a ball head support 604 and a support rod 602, the cylindrical head base 601 is connected to the first rotating plate 306, the cylindrical head base 601 is connected with a ball head support 604, the ball head support 604 is used to connect a ball head 603 on the support rod 602, the support block 613 is connected with the guide rail 8, the support block 613 is used to fix the support rod 602;

The front bar fixing system 9 includes a sliding clamp 901 and a fixing piece 902, the sliding clamp 901 is provided with a clamp head 9012, the fixing piece 902 is provided with a clamp head positioning side wing 9021, the clamp head positioning side wing 9021 is fitted to the clamp head 9012.

EMBODIMENT 3

As shown in FIGS. 1-8, 13-15 and 22-24, a tri-fold semi-embedded cover for a front bar with front extension panel includes a front bar 1, a panel body 2, a first rotating plate system 3, a second rotating plate system 5, a locking system 4, a support rod system 6, a rear bar 7, a guide rail 8 and a front bar fixing system 9;

The front bar fixing system 9 is connected to the front bar 1, the locking system 4 is connected to the rear bar 7, the locking system includes a lock bolt 401, the first rotating plate system 3 is provided with a first rotating plate 306 and a large rotating plate 304, the second rotating plate system 5 is provided with a second rotating plate, the first rotating plate 306 is of a width greater than or equal to the width of the second rotating plate;

The support rod system 6 includes a cylindrical head base 601A, a ball head support 604 and a support rod 602, the cylindrical head base 601A is connected to the large rotating plate 304, the cylindrical head base 601A is connected with the ball head support 604, the ball head support (604) is used to connect the ball 603 on the support rod 602, the support rod system 6 is connected to a clamp support system, the clamp support system is connected to a support block 613, the support block 613 is used to fix the support rod 602, the cylindrical head base 601A is provided with a horizontal surface 601A1;

The front bar fixing system 9 includes a sliding clamp 901 and a fixing piece 902, the sliding clamp 901 is provided with a clamp head 9012, the fixing piece 902 is provided with a clamp head positioning side wing 9021, the clamp head positioning side wing 9021 is fitted to the clamp head 9012.

The clamp system is connected to the car body, the guide rail 8 is provided with a guide rail notch 8051.

The clamp system can be connected to the car body only without connecting to the guide rails. In order to avoid the guide rail 8, the guide rail 8 needs to be provided with a guide rail notch 8051.

EMBODIMENT 4

Figure 19:
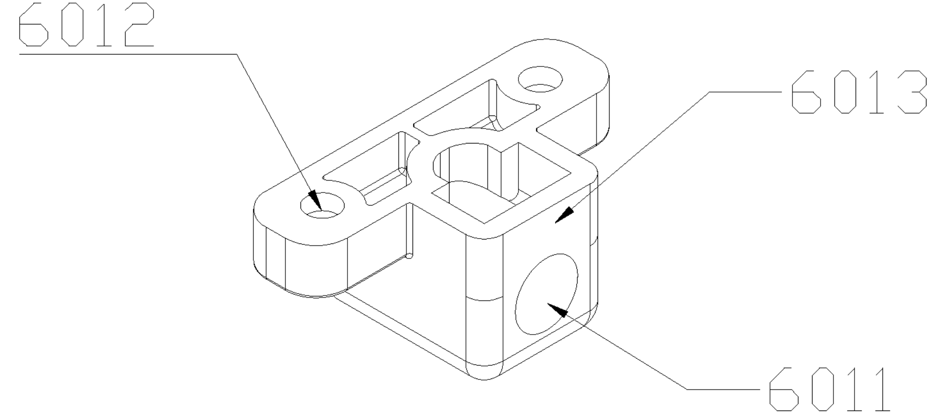
FIG. 19 is a structural schematic diagram of a cylindrical head base.
Figure 20:
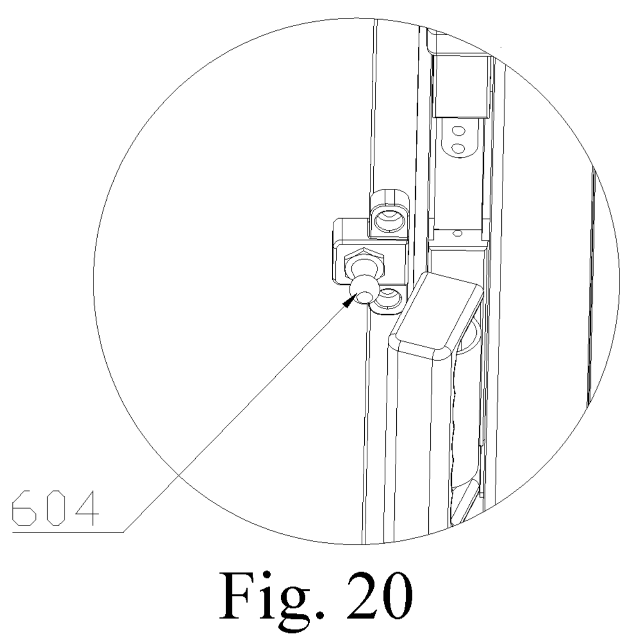
FIG. 20 is a installation schematic diagram I of the support head ball.
Figure 21:
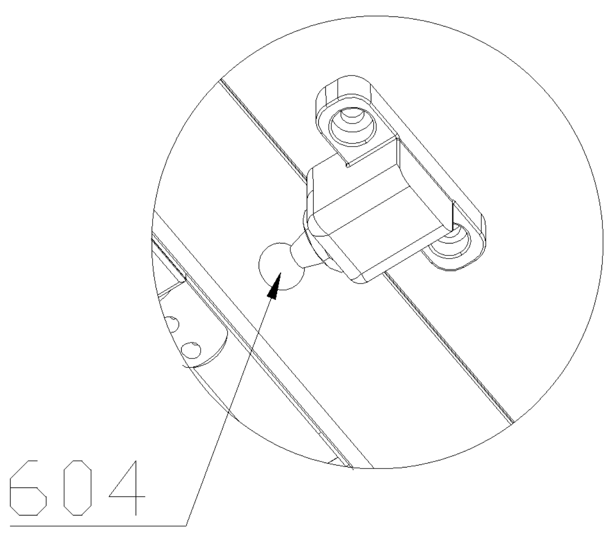
FIG. 21 is a installation schematic diagram II of the support head ball.
Figure 22:
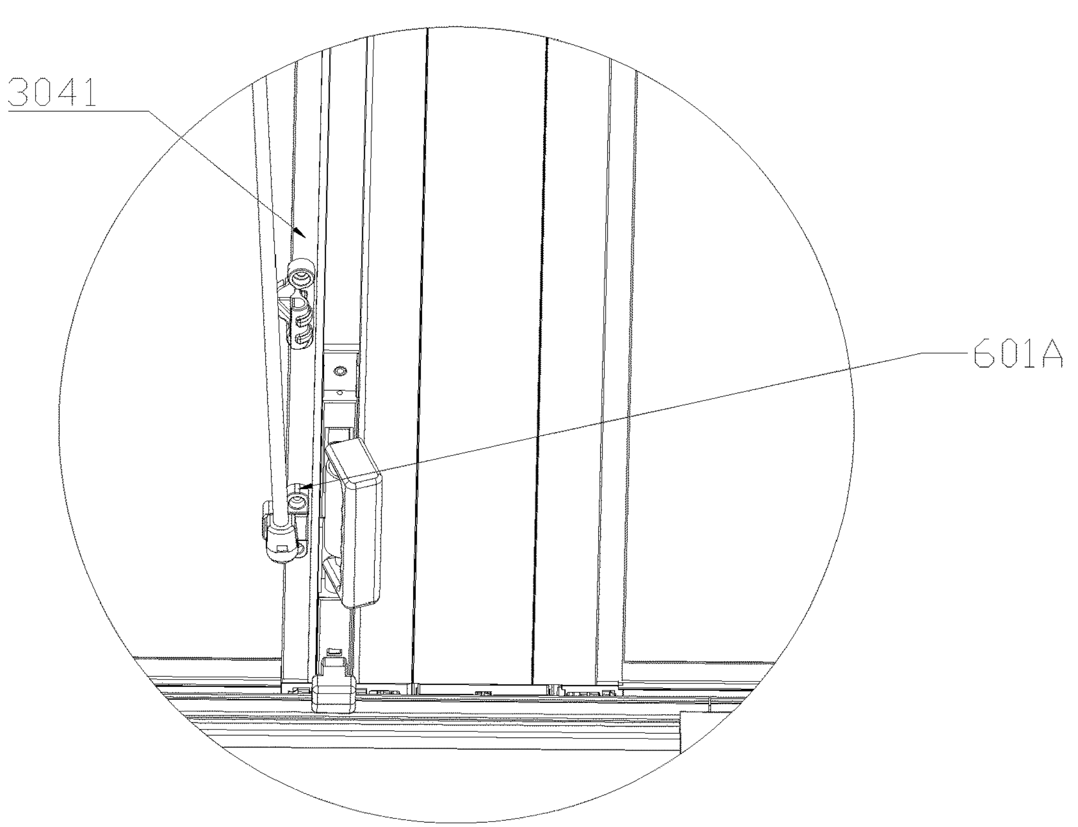
FIG. 22 is a installation schematic diagram I of the cylindrical head base.
Figure 23:
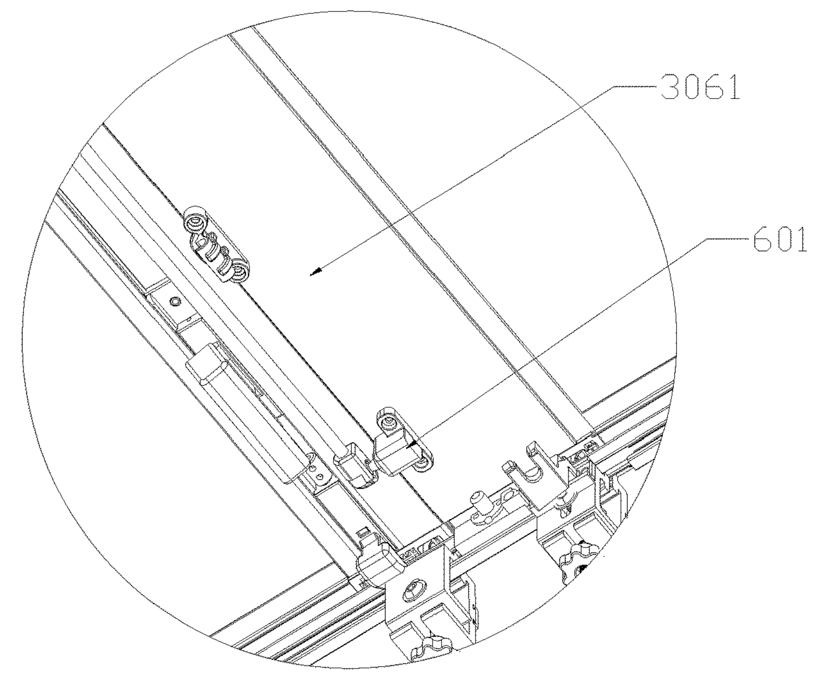
FIG. 23 is a installation schematic diagram II of the cylindrical head base.
Figure 24:
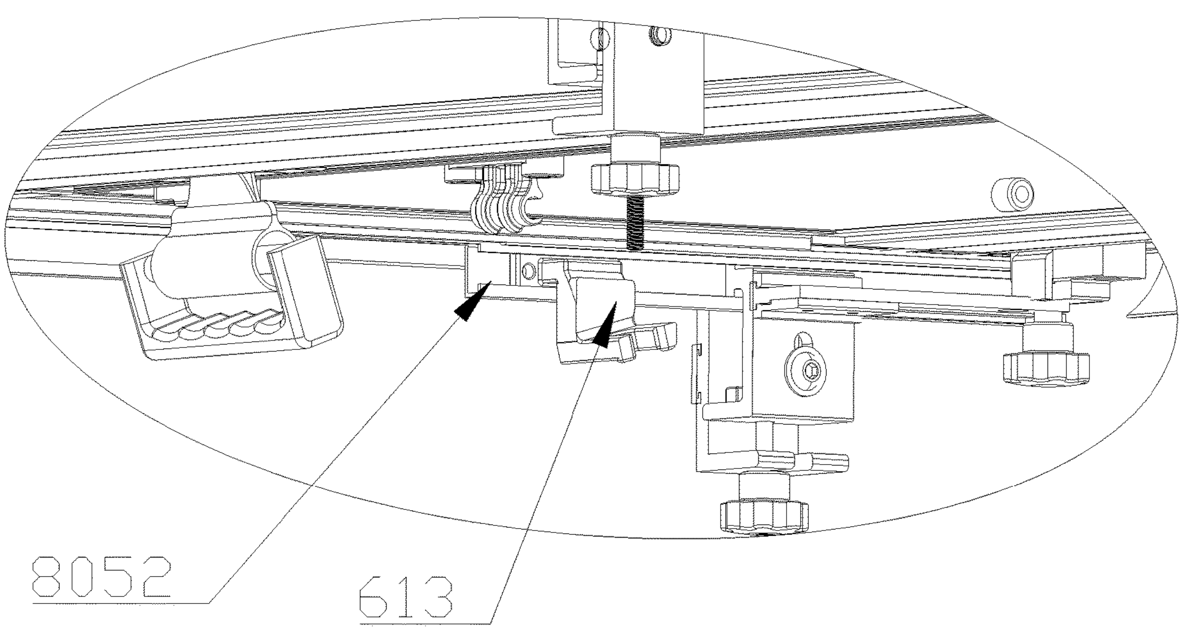
FIG. 24 is a connection schematic diagram of the support block.

On the basis of Embodiment 1 and 2, as shown in FIG. 19, the support rod system 6 includes a cylindrical head base 601, a support rod 602, a ball head 603, a ball head support 604, a first cylinder 605, a second cylinder 606 and a bottom cap 607;

The cylindrical head base 601 is provided with a protrusion 6013, a fixing threaded hole 6011 and a cylindrical head base fixing hole 6012, the fixing threaded hole 6011 and the cylindrical head base fixing hole 6012 are provided vertically to each other, the screws connect the cylindrical head base 601 to the first rotating plate 306 through the cylindrical head base fixing hole 6012, the fixing threaded hole 6011 are connected with a ball head support 604, the ball head support 604 is connected with a ball head 603;

One end of the support rod 602 is connected to the ball head 603, the other end of the support rod 602 is connected to the half-waist hole 6132 of the support block 613, the support rod 602 is provided with a support rod thread 6021, the support rod thread 6021 is connected to a first cylinder 605 and a second cylinder 606, the end of the support rod 602 is connected to a bottom cap 607. The bottom cap 607 is used to prevent the end of the support rod 502 from scratching the fingers, the support rod 602 is held in place by adjusting the distance between the first cylinder 605 and second cylinder 606 to clamp the half-waist hole 6132 on the support block, the support rod 602 is provided with a support step 6022 for blocking the first cylinder 605.

EMBODIMENT 5

On the basis of Embodiment 3, the cylindrical head base 601A is provided with a horizontal surface 601A1 and a fixing threaded opening 601A2, the horizontal surface 601A1 is provided in parallel with the bottom surface of the joint 302, the fixing threaded opening 601A2 is used to fix a ball head support 604, the ball head support 604 is used to fix the support rod 602.

EMBODIMENT 6

Figure 18:
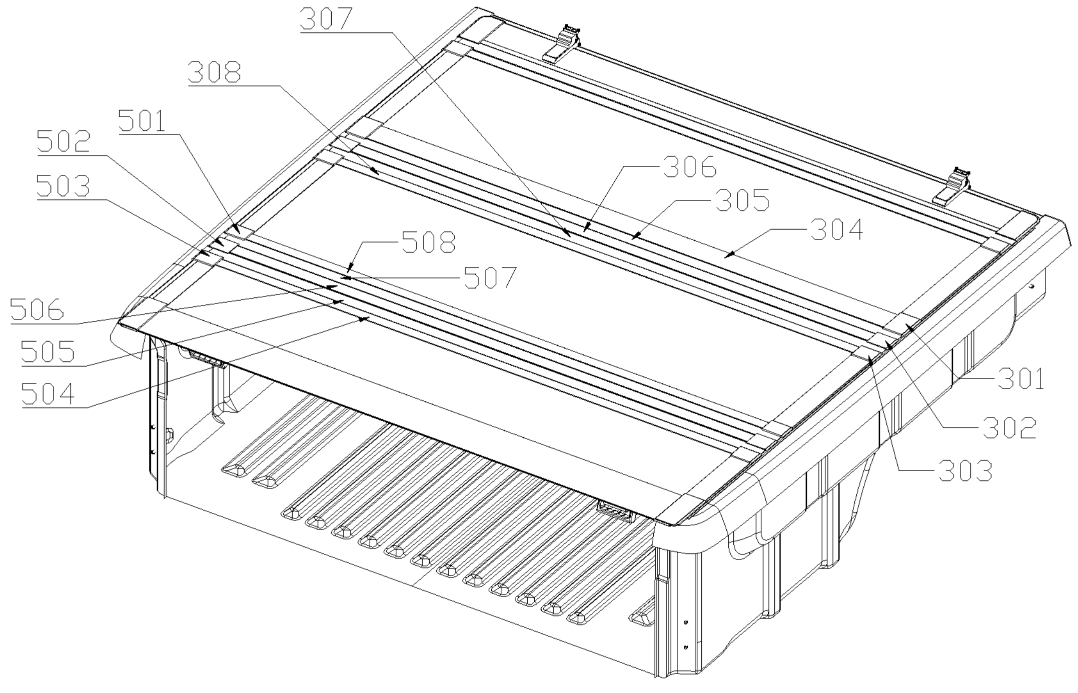
FIG. 18 is a use schematic diagram V of the present invention.

On the basis of Embodiment 1-3, as shown in FIG. 18, the first rotating plate system 3 includes a large joint 301, a joint 302, a small joint 303, a large rotating plate 304, a first rotating plate 306, a first rotating plate rubber strip 305, a second rotating plate rubber strip 307, and a small rotating plate 308;

The large rotating plate 304 is connected to the first rotating plate 306, a first rotating plate rubber strip 305 is provided between the large rotating plate 304 and the first rotating plate 306, the first rotating plate 306 is connected to the small rotating plate 308, a second rotating plate rubber strip 307 is provided between the first rotating plate 306 and the small rotating plate 308; the large rotating plate 304, the first rotating plate 306, the small rotating plate 308, the first rotating plate rubber strip 305 and the second rotating plate rubber strip 307 constitute a rotating plate system, both ends of that rotating plate system are connected with a large joint 301, a joint 302, and a small joint 303.

EMBODIMENT 7

On the basis of Embodiment 1-3, as shown in FIG. 18, the second rotating plate system 5 includes a first rotating plate small joint 501, a rotating plate joint 502, a second rotating plate small joint 503, a first small rotating plate 504, a second rotating plate 506, a third rotating plate rubber strip 505, a fourth rotating plate rubber strip 507 and a second small rotating plate 508;

The first small rotating plate 504 is connected to the second rotating plate 506, a third rotating plate rubber strip 505 is provided between the first small rotating plate 504 and the second rotating plate 506, the second rotating plate 506 is connected to the second small rotating plate 508, a fourth rotating plate rubber strip 507 is provided between the second rotating plate 506 and the second small rotating plate 508, the first small rotating plate 504, the second rotating plate 506, the second small rotating plate 508, the third rotating plate rubber strip 505, and the fourth rotating plate rubber strip 507 constitute a rotating plate system, both ends of the rotating plate system is connected with a first rotating plate small joint 501, a rotating plate joint 502 and a second rotating plate small joint 503.

EMBODIMENT 8

On the basis of Embodiment 1-3, as shown in FIG. 9-17, the front bar fixing system 9 includes a sliding clamp 901, a fixing piece 902, an extension panel 903, a front bar plum nut 904, a right securing clamp 905, a left securing clamp 906, a screw 907, a plum nut 908, and a T-screw 909; The sliding clamp 901 is provided with a clamp thread 9011 and a clamp head 9012.

The fixing piece 902 includes a clamp head positioning side wing 9021, a fixing resisting step 9022 and a fixing nut hole 9023;

The extension panel 903 includes a fine adjustment hole 9031, a first screw hole 9032, a second screw hole 9033 and an extension panel protrusion 9034;

The front bar plum nut 904 is provided with a thread head 9041, a first step 9042, a second step 9043 and a third step 9044;

The left securing clamp 906 is provided with a support plane 9061, a left clamp groove 9062, and a left clamp step 9063;

The sliding clamp 901 in cooperation with the fixing piece 902 to connect the processing groove 1031 of the first profile 103, the clamp profile are provided in the processing groove 1031 against the step 9013 and the fixing resisting step 9022, the head positioning side wings 9021 are provided on both sides of the clamp head 9012, the fixing nut holes 9023 and the clamp head 9012 are overlapping provided and cooperated with the fixing nut hole 9023 through the thread head 9041, the second step 9043 is seated on the clamp head 9012, so that the front bar plum nut 904 makes the sliding clamp 901 and the fixing member 902 fit, the clamp thread 9011 secures the sliding clamp 901 and the fixing piece 902 in the processing groove by means of a screw, the fine adjust hole 9031 is assembled in cooperation with the front bar plum nut 904, the front bar plum nut 904 passes through the fine adjustment hole 9031, rotates the plum nut 904 and then snaps into place with the extension panel 90) through the third step 9044, the centre part of the first step 9042 and the second step 9043 are fitted with the half U-shaped hole of the clamp head 9012.

The front bar plum nut 904 can be prevented from loosening after tightening, the support plane 9061 and the extension panel protrusion 9034 are fastened through the first screw holes 9032 and the second screw holes 9033, the extension panel protrusion 9034 fixes the extension panel 903 to the left clamp groove 9062, the left clamp step 9063 and the extension panel surface 9035 cooperate to provide positioning of the left securing clamp 906 and extension plate 903.

EMBODIMENT 9

On the basis of Embodiment 1 and 2, the clamp system is connected to the car body, the guide rail 8 is provided with a guide rail notch 8051, the clamp system is set in the guide rail notch 8051. Alternatively the clamp system is connected to the car body and the guide rail 8 so that the guide rail 8 is not required to be provided with a guide rail notch 8051.

EMBODIMENT 10

Figure 25:
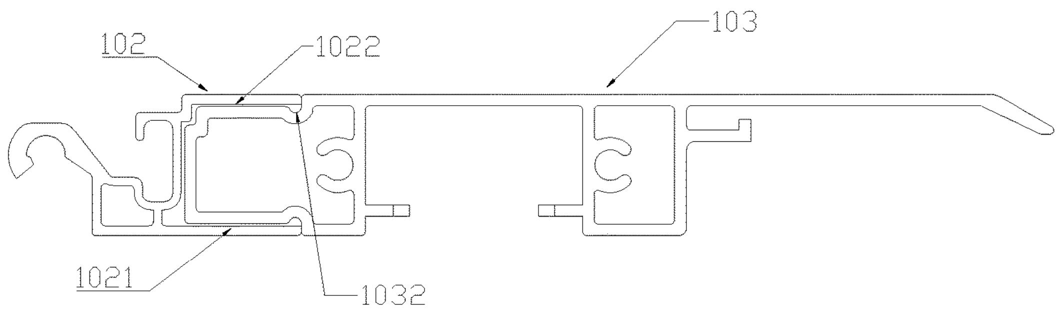
FIG. 25 is a structural schematic diagram of the front bar.

On the basis of Embodiment 1 and 2, as shown in FIG. 25, the front bar 1 is a split structure, the front bar 1 includes a first profile 103 and a second profile 102, the first profile 103 is provided with a gluing groove 1032, the second profile 102 is provided with a profile first gluing surface 1021 and a profile second gluing surface 1022, the second profile 102 is bonded to the first profile by means of the profile first gluing surface 1021 and the profile second gluing surface 1022, the gluing groove 1032 is used to store excess glue, The cylindrical head base 601 and the ball head support 604 are of a one-piece structure or a split structure, the cylindrical head base 601A and the ball head support 604 are of a one-piece structure or a split structure. The cylindrical head base 601 and the ball head support 604 can be of a one-piece structure or a split structure. The same applies to the cylindrical head base 601A and the ball head support 604.

The invention is not limited to the above-mentioned optional embodiments. Anyone can come up with various other forms of products under the inspiration of the invention, however, regardless of any changes in its shape or structure. All technical solutions that fall within the scope defined by the claims of the present invention shall fall within the scope of protection of the invention.

What is claimed is:

1. A tri-fold semi-embedded cover for a front bar with front extension panel, comprising: a front bar (1), a panel body (2), a first rotating plate system (3), a second rotating plate system (5), a locking system (4), a support rod system (6), a rear bar (7), a guide rail (8) and a front bar fixing system (9);

the front bar fixing system (9) is connected to the front bar (1), the locking system (4) is connected to the rear bar (7), the first rotating plate system (3) is provided with a first rotating plate (306), the second rotating plate system (5) is provided with a second rotating plate, the first rotating plate (306) is of a width greater than or equal to the width of the second rotating plate;

the support rod system (6) includes a cylindrical head base (601), a support rod (602) and a ball head support (604), the cylindrical head base (601) is connected to the first rotating plate (306), the cylindrical head base (601) is connected with the ball head support (604), the ball head support (604) is used to connect a ball head (603) on the support rod (602), the support rod system (6) is connected with a clamp support system, the clamp support system is connected with a support block (613), the support block (613) is used to fix the support rod (602);

the front bar fixing system (9) includes a sliding clamp (901) and a fixing piece (902), the sliding clamp (901) is provided with a clamp head (9012), the fixing piece (902) is provided with a clamp head positioning side wing (9021), the clamp head positioning side wing (9021) is fitted to the clamp head (9012).

2. A tri-fold semi-embedded cover for a front bar with front extension panel, wherein, it includes a front bar (1), a panel body (2), a first rotating plate system (3), a second rotating plate system (5), a locking system (4), a support rod system (6), a rear bar (7), a guide rail (8) and a front bar fixing system (9);

the front bar fixing system (9) is connected to the front bar (1), the locking system (4) is connected to the rear bar (7), the first rotating plate system (3) is provided with a first rotating plate (306), the second rotating plate system (5) is provided with a second rotating plate, the first rotating plate (306) is of a width greater than or equal to the width of the second rotating plate;

the support rod system (6) includes a cylindrical head base (601), a support block (613), a ball head support (604) and a support rod (602), the cylindrical head base (601) is connected to the first rotating plate (306), the cylindrical head base (601) is connected with a ball head support (604), the ball head support (604) is used to connect a ball head (603) on the support rod (602), the support block (613) is connected with the guide rail (8), the support block (613) is used to fix the support rod (602);

the front bar fixing system (9) includes a sliding clamp (901) and a fixing piece (902), the sliding clamp (901) is provided with a clamp head (9012), the fixing piece (902) is provided with a clamp head positioning side wing (9021), the clamp head positioning side wing (9021) is fitted to the clamp head (9012).

3. A tri-fold semi-embedded cover for a front bar with front extension panel, wherein, it includes a front bar (1), a panel body (2), a first rotating plate system (3), a second rotating plate system (5), a locking system (4), a support rod system (6), a rear bar (7), a guide rail (8) and a front bar fixing system (9);

the front bar fixing system (9) is connected to the front bar (1), the locking system (4) is connected to the rear bar (7), the locking system includes a lock bolt (401), the first rotating plate system (3) is provided with a first rotating plate (306) and a large rotating plate (304), the second rotating plate system (5) is provided with a second rotating plate and a large rotating plate, the first rotating plate (306) is of a width greater than or equal to the width of the second rotating plate;

the support rod system (6) includes a cylindrical head base (601A), a ball head support (604) and a support rod (602), the cylindrical head base (601A) is connected to the large rotating plate (304), the cylindrical head base (601A) is connected with the ball head support (604), the ball head support (604) is used to connect a ball head (603) on the support rod (602), the support rod system (6) is connected to a clamp support system, the clamp support system is connected to a support block (613), the support block (613) is used to fix the support rod (602), the cylindrical head base (601A) is provided with a horizontal surface (601A1);

the front bar fixing system (9) includes a sliding clamp (901) and a fixing piece (902), the sliding clamp (901) is provided with a clamp head (9012), the fixing piece (902) is provided with a clamp head positioning side wing (9021), the clamp head positioning side wing (9021) is fitted to the clamp head (9012).

4. A tri-fold semi-embedded cover for a front bar with front extension plate according to claim 1 or 2, wherein that the support rod system (6) includes), a first cylinder (605), a second cylinder (606) and a bottom cap (607);

the cylindrical head base (601) is provided with a protrusion (6013), a fixing thread hole (6011) and a cylindrical head base fixing hole (6012), the fixing thread hole (6011) and the cylindrical head base fixing hole (6012) are provided perpendicularly to each other, the screws connect the cylindrical head base (601) to the first rotating plate (306) through the cylindrical head base fixing hole (6012), the fixing thread hole (6011) is connected with the ball head support (604), the ball head support (604) is connected with the ball head (603);

one end of the support rod (602) is connected to the ball head (603), the other end of the support rod (602) is connected to a half-waist hole (6132) of the support block (613), the support rod (602) is provided with a support rod thread (6021), the support rod thread (6021) is connected to the first cylinder (605) and the second cylinder (606), the end of the support rod (602) is connected to a bottom cap (607).

5. A tri-fold semi-embedded cover for a front bar with front extension panel according to claim 3, wherein, the cylindrical head base (601) is provided with a horizontal surface (601A1) and a fixing threaded opening (601A2), the horizontal surface (601A1) is set in parallel with the bottom surface of a joint (302), the fixing thread opening (601A2) is used for fixing the ball head support (604), the ball head support (604) is connected with a ball head (603), the ball head (603) is used to fix the support rod (602).

6. A tri-fold semi-embedded cover for a front bar with front extension panel according to any one of claims 1-3, wherein, the first rotating plate system (3) includes a large joint (301), a medium joint (302), a small joint (303), a large rotating plate (304), the first rotating plate (306), the first rotating plate rubber strip (305), the second rotating plate rubber strip (307), and a small rotating plate (308);

the large rotating plate (304) is connected to the first rotating plate (306), a first rotating plate rubber strip (305) is provided between the large rotating plate (304) and the first rotating plate (306), the first rotating plate (306) is connected to the small rotating plate (308), a second rotating plate rubber strip (307) is provided between the first rotating plate (306) and the small rotating plate (308); the large rotating plate (304), the first rotating plate (306), the small rotating plate (308), the first rotating plate rubber strip (305), and the second rotating plate rubber strip (307) constitute a rotating plate system, both ends of that rotating plate system are connected with a large joint (301), a joint (302), and a small joint (303).

7. A tri-fold semi-embedded cover for a front bar with front extension panel according to any one of claims 1-3, wherein, the second rotating plate system (5) includes a first rotating plate small joint (501), a rotating plate joint (502), a second rotating plate small joint (503), a first small rotating plate (504), a second rotating plate (506), a third rotating plate rubber strip (505), a fourth rotating plate rubber strip (507) and a second small rotating plate (508);

the first small rotating plate (504) is connected to the second rotating plate (506), a third rotating plate rubber strip (505) is provided between the first small rotating plate (504) and the second rotating plate (506), the second rotating plate (506) is connected to the second small rotating plate (508), a fourth rotating plate rubber strip (507) is provided between the second rotating plate (506) and the second small rotating plate (508), the first small rotating plate (504), the second rotating plate (506), the second small rotating plate (508), the third rotating plate rubber strip (505) and the fourth rotating plate rubber strip (507) constitute a rotating plate system, both ends of the rotating plate system is connected with a first rotating plate small joint (501), a rotating plate joint (502) and a second rotating plate small joint (503).

8. A tri-fold semi-embedded cover for front bar with front extension panel according to any one of claims 1-3, wherein, the front bar fixing system (9) includes the sliding clamp (901), a fixing piece (902), an extension panel (903), a front bar plum nut (904), a right securing clamp (905), a left securing clamp (906), a screw (907), a plum nut (908), and a T-screw (909);

the sliding clamp (901) is provided with a clamp thread (9011), a clamp head (9012) and a clamp profile resisting step (9013);

the fixing piece (902) includes a clamp head positioning side wing (9021), a fixing resisting step (9022) and a fixing nut hole (9023);

the extension panel (903) includes a fine adjustment hole (9031), a first screw hole (9032), a second screw hole (9033) and an extension panel protrusion (9034);

the front bar plum nut (904) is provided with a thread head (9041), a first step (9042), a second step (9043) and a third step (9044);

the left securing clamp (906) is provided with a support plane (9061), a left clamp groove (9062), and a left clamp step (9063);

the sliding clamp (901) in cooperation with the fixing piece (902) to connect the processing groove (1031) of the first profile (103), the clamp profile are provided in the processing groove (1031) against the step (9013) and the fixing resisting step (9022), the head positioning side wings (9021) are provided on both sides of the clamp head (9012), the fixing nut holes (9023) and the clamp head (9012) are overlapping provided and cooperated with the fixing nut hole (9023) through the thread head (9041), the second step (9043) is seated on the clamp head (9012), so that the front bar plum nut (904) makes the sliding clamp (901) and the fixing piece (902) fit, the clamp thread (9011) secures the sliding clamp (901) and the fixing piece (902) in the processing groove by means of a screw, the fine adjust hole (9031) is assembled in cooperation with the front bar plum nut (904), the front bar plum nut (904) passes through the fine adjustment hole (9031), rotates the plum nut (904) and then snaps into place with the extension panel (903) through the third step (9044), the centre part of the first step (9042) and the second step (9043) are fitted with the half U-shaped hole of the clamp head (9012).

9. Tri-fold semi-embedded cover for a front bar with front extension panel according to any one of claim 1 or 3, wherein, the clamp system is connected to the car body, the guide rail (8) is provided with a guide rail notch (8051), the clamp system is provided in the guide rail notch (8051) and is only used to connected the car body.

10. A tri-fold semi-embedded cover for front bar with front extension panel according to any one of claim 1 or 3, wherein, the clamp support system is connected to a car body and the guide rail (8).

11. Tri-fold semi-embedded cover for front bar with front extension panel according to any one of claims 1-3, wherein, the front bar (1) is a split structure, the front bar (1) includes a first profile (103) and a second profile (102), the first profile (103) is provided with a gluing groove (1032), the second profile (102) is provided with a profile first gluing surface (1021) and a profile second gluing surface (1022), the second profile (102) is bonded to the first profile (103) by means of the profile first gluing surface (1021) and the profile second gluing surface (1022), the gluing groove (1032) is used to store excess glue.

12. A tri-fold semi-embedded cover for a front bar with front extension panel according to any one of claims 1-3, wherein the cylindrical head base (601) and the ball head support (604) are of a one-piece structure or a split structure.

* * * * *